(12) United States Patent
Steindorff et al.

(10) Patent No.: US 11,702,116 B2
(45) Date of Patent: Jul. 18, 2023

(54) RAILWAY VEHICLE WITH ANTIFREEZING DEVICE, AND RELATED METHOD

(71) Applicant: ALSTOM Transport Technologies, Saint-Ouen-sur-Seine (FR)

(72) Inventors: Konrad Steindorff, Braunschweig (DE); Rene Gessing, Braunschweig (DE)

(73) Assignee: ALSTOM Transport Technologies, Saint-Ouen (FR)

( * ) Notice: Subject to any disclaimer, the term of this patent is extended or adjusted under 35 U.S.C. 154(b) by 436 days.

(21) Appl. No.: 16/812,648

(22) Filed: Mar. 9, 2020

(65) Prior Publication Data

US 2020/0283036 A1    Sep. 10, 2020

(30) Foreign Application Priority Data

Mar. 7, 2019  (EP) .................................... 19305264

(51) Int. Cl.
*B61D 27/00*  (2006.01)
*H01M 8/04*   (2016.01)
(Continued)

(52) U.S. Cl.
CPC .... *B61D 27/0045* (2013.01); *H01M 8/04164* (2013.01); *H01M 8/04007* (2013.01); *H01M 2250/405* (2013.01)

(58) Field of Classification Search
CPC ............... B61D 27/0045; B61D 17/04; H01M 8/04225; H01M 8/04007; H01M 8/04253;
(Continued)

(56) References Cited

U.S. PATENT DOCUMENTS

2010/0055523 A1*  3/2010  Ogawa ............. H01M 8/04164
                                                      429/426
2018/0093586 A1*  4/2018  Steindorff .......... H01M 8/2475

FOREIGN PATENT DOCUMENTS

JP    2018101475 A  *  6/2018
JP    2018101475 A     6/2018

OTHER PUBLICATIONS

Ohashi Yasuhiko; Large Vehicle; JP2018101475A; EPO English Machine Translation; pp. 1-4 (Year: 2016).*

(Continued)

*Primary Examiner* — Bayan Salone
(74) *Attorney, Agent, or Firm* — Knobbe, Martens, Olson & Bear, LLP

(57) ABSTRACT

A railway vehicle includes a car body having a shell frame surrounding an internal area suitable for accommodating passengers, and a power generator connected to an external side of the car body and including an outlet for discharging out a liquid produced during generation of electricity. A hydraulic system is in fluid communication with the outlet and receives at least part of the liquid produced during generation of electricity. The hydraulic system includes a first end portion connected to the outlet, a second end portion, spaced apart from the first end portion, for draining out from the hydraulic system the received liquid, and a third intermediate portion which is interconnected between the first and second end portions and is placed, at least partially, in the internal area of the car body, which is adapted to be heated before receiving passengers.

11 Claims, 4 Drawing Sheets

(51) Int. Cl.
*H01M 8/04119* (2016.01)
*H01M 8/04007* (2016.01)

(58) Field of Classification Search
CPC ......... H01M 8/04291; H01M 8/04164; H01M 8/04156; H01M 2250/405; H01M 2250/20; B61C 7/04; Y02E 60/50; Y02T 30/00; Y02T 90/40
See application file for complete search history.

(56) References Cited

OTHER PUBLICATIONS

European Search Report for EP Application No. 19305264, dated Jul. 10, 2019 in 6 pages.

* cited by examiner

RAILWAY VEHICLE WITH ANTIFREEZING DEVICE, AND RELATED METHOD

TECHNICAL FIELD

The present disclosure concerns, in general, railway vehicles operating under harsh winter conditions and provided with an external power generation device capable of generating electricity, and more in particular to a railway vehicle provided with a power generation device and a related method suitable for discharging any liquid which might be produced by the power generation device when generating electricity The railway vehicle and method according to the disclosure are particularly suitable for use with fuel cell systems as associated power generation devices, and therefore they will be described by making particular reference to such preferred configuration, without intending anyway to limit the possible application with other types of suitable power generation devices.

BACKGROUND OF THE INVENTION

As known, railway vehicles use more and more power generation devices, e.g. as auxiliary units, in order to produce additional electricity which can be exploited for various needs.

Power generation devices used in connection with railway vehicles are for instance fuel cell systems.

Conventional fuel cell systems generally include a fuel cell, which is supplied with a fuel gas that contains hydrogen, and an oxidation gas, e.g. air, that contains oxygen.

The electrochemical reaction of such gases in the fuel cell generates electric power, as well as other by-products, such as process water.

One part of this process water produced in the reaction process is dissipated into the environment, e.g. as steam, via an exhaust gas outlet of the fuel cell system.

However, a usually non-negligible portion of the process water condenses already inside the fuel cell system and must be removed in a controlled manner.

This issue is not particularly relevant when the fuel cell system is functioning or in any case resides in environments where temperatures are above freezing point, and several well-established solutions have been adopted in order to discharge such process water outside the fuel cell system.

To this end, a conventional fuel cell system is usually provided with a discharge valve in a circulating system, which circulating system is used to circulate and supply fuel off gas to a fuel cell with a circulation pump.

By opening the discharge valve, the water that is generated through the electrochemical reaction in the fuel cell is actively discharged into the circulating system together with the fuel off gas by a circulation pump, and then out of the circulating system through the discharge valve.

Unfortunately, in environments rather cold, e.g. with temperatures below 0° C., the risk that the process water may freeze, and cause substantial damages, is not negligible.

For instance, when water freezes and the entire system is cold, e.g. at the start-up of the fuel cell after a certain rest period, the frozen water may adhere to the discharge valve or to the inner surfaces of the flow path from the fuel cell to the discharge valve, thus causing an opening failure of the discharge valve itself.

To cope with this issue, one solution foresees the use of an additional heater that is used to melt down the ice formed.

Such solution is not necessarily fully efficient and effective, in particular if the heater is fed by the fuel cell system itself.

Indeed, in such a case, the heater would be substantially useless at the start-up of the fuel cell system, i.e. when freezing is most likely already occurred.

Other solutions, such as the one described in US 2010/0055523 A1, have devised the use of rather sophisticated control units for controlling the status of the process water inside the fuel cell system itself.

Unfortunately, also such solutions would not be efficient when fuel cells are used in connection with rail vehicles operating in cold zones.

In particular, when the railway vehicle is shut down, it is possible that the external pipe used for draining the process water out from the fuel cell system, might be partially filled or wet with such process water whose icing would not be impeded anymore by hot process water which flows when the railway vehicle and the associated fuel cell system are operating.

Hence, such leftover water can be transformed into ice and thus can block the outlet of the discharging pipe.

As a consequence, when the fuel cell system is started again, there is the substantial risk that the formed ice hinders the outflow of newly produced process water, thus pushing back such new water back inside the system and, in the end, damaging the fuel cell.

Therefore, there is a need of having improved railway vehicles.

SUMMARY OF THE INVENTION

This need is fulfilled by a railway vehicle comprising at least:
  a car body having a shell frame surrounding an internal area;
  a power generation device for generating electricity which is connected to an external side of said car body, wherein said power generation device comprises an outlet for discharging out a liquid produced during generation of electricity;
  a hydraulic system which is in fluid communication with said outlet and receives at least part of the liquid produced during generation of electricity by said power generation device, wherein said hydraulic system comprises a first end portion connected to said outlet, a second end portion, spaced apart from said first end portion, for draining out from the hydraulic system the received liquid, and a third intermediate portion which is interconnected between said first and second end portions and is placed, at least partially, in an internal area of the car body which is adapted to be heated.

The above mentioned need is also fulfilled by a method for discharging a liquid produced during generation of electricity by a power generation device connected to an external side of a car body of a railway vehicle, said power generation device comprising an outlet for discharging out at least part of said liquid produced during generation of electricity, the method comprising at least:
  a) putting a hydraulic system in fluid communication with said outlet, wherein at least a portion of said hydraulic system is placed, at least partially, in an internal area of the car body;
  b) heating said internal area of the car body;
  c) conveying, at least part of the liquid produced during generation of electricity by said power generation device, via said hydraulic system, inside said heated internal area;

d) draining outside the car body, via said hydraulic system, the conveyed liquid at a position spaced apart from said outlet.

BRIEF DESCRIPTION OF THE DRAWINGS

Further characteristics and advantages will become apparent from the description of some preferred but not exclusive exemplary embodiments of a railway vehicle and a method according to the present disclosure, illustrated only by way of non-limitative examples with the accompanying drawings, wherein.

DETAILED DESCRIPTION

Figure 1:
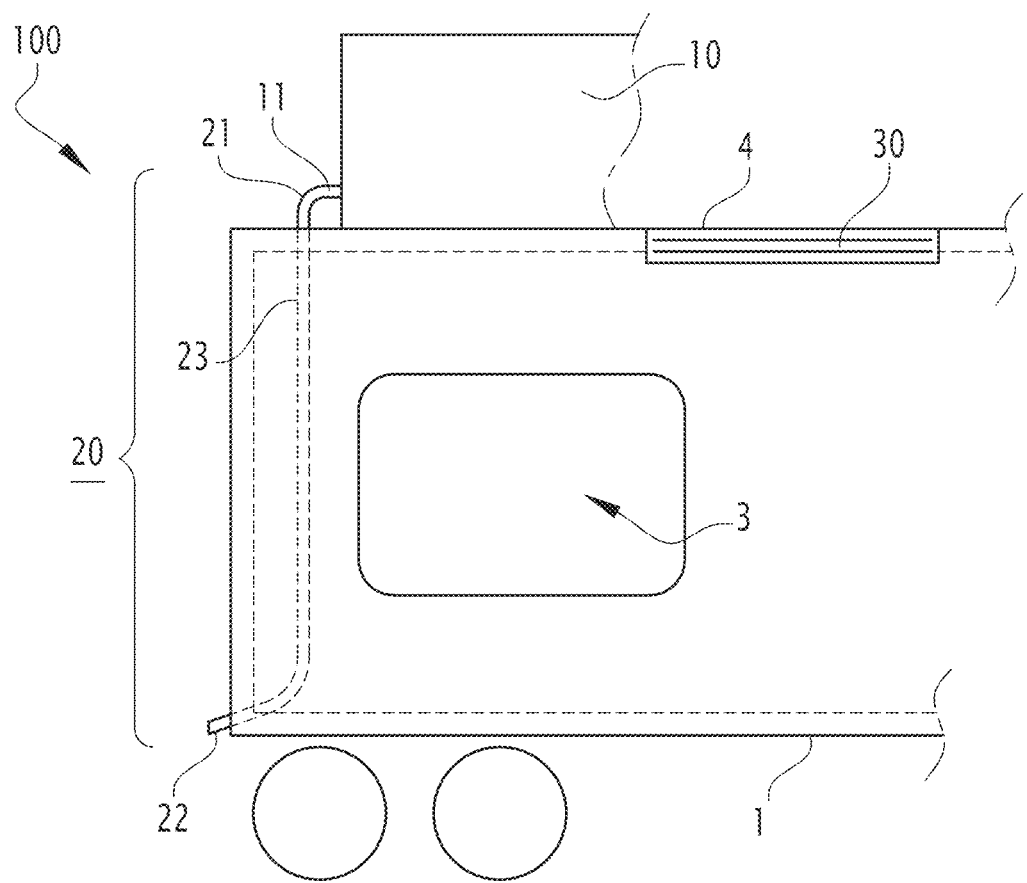
FIG. 1 is a view schematically representing a railway vehicle provided with an anti-freezing device according to the present disclosure.

It should be noted that in the detailed description that follows, identical or similar components, either from a structural and/or functional point of view, have the same reference numerals, regardless of whether they are shown in different embodiments of the present disclosure; it should also be noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration and/or form and/or positioning of the related component or part thereof, or combinations, such term refers to.

Figure 2:
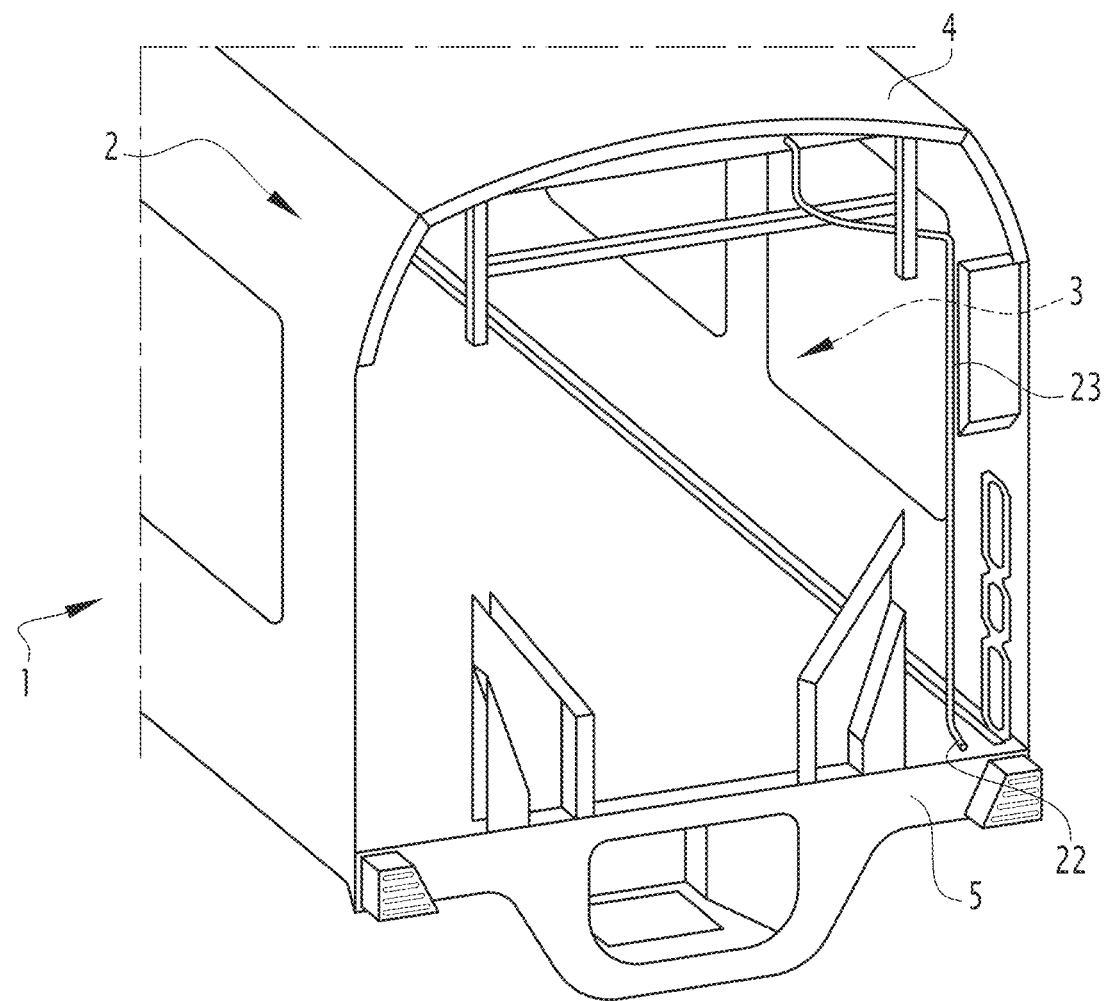
FIG. 2 is a perspective view showing part of the car body of a railway vehicle provided with the anti-freezing device according to the present disclosure.
Figure 3:
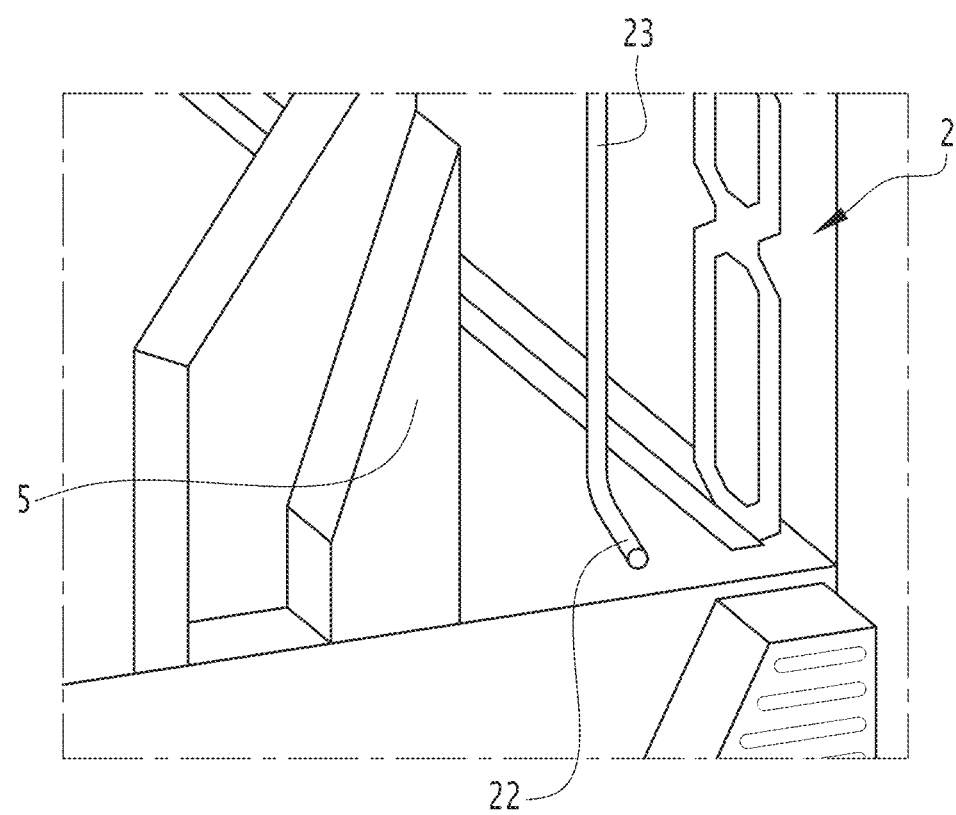
FIG. 3 is a perspective views showing in greater details parts of the car body illustrated in FIG. 2.

In FIG. 1 there is schematically illustrated an exemplary railway vehicle, indicated by the reference number 100, which comprises a car body, indicated in FIG. 1 by the reference number 1, having a shell frame, partially illustrated in FIGS. 2 and 3 and therein indicated by the reference number 2.

According to solutions well known in the art and therefore herein not described in detail, the shell frame 2 comprises a plurality of frame members assembled together to form the skeleton of the railway car body 1.

Once the railway vehicle 100 is put in operation, the car body 1 surrounds an interior space 3, e.g. a sitting compartment, suitable for accommodating passengers.

As schematically illustrated in FIG. 1, a power generation device 10 for generating electricity is connected to an external side of the car body 1, and in particular it is positioned on and connected to the roof 4 of the car body 1 itself.

The power generation device 10 used in the railway vehicle 100 according to the present disclosure can be constituted by any suitable device or group of devices capable of producing electricity, in particular via a chemical reaction, where a liquid can be produced during the process of electricity generation, which liquid needs to be at least partially discharged out.

To this end, as schematically illustrated in FIG. 1, the power generation device 10 comprises an outlet 11 purposively provided for discharging out such liquid produced during generation of electricity.

In particular, in one embodiment, the power generation device 10 comprises a fuel cell and the liquid produced when generating electricity comprises water.

The railway vehicle 100 according to the present disclosure comprises an anti-freezing device which is arranged to prevent freezing of the liquid produced during generation of electricity and to be discharged, e.g. the water produced by a fuel cell system, as well as to thaw already frozen liquid.

In particular, the anti-freezing device comprises a hydraulic system, schematically indicated in FIG. 1 by the overall reference number 20, which is put in fluid communication with the outlet 11 and receives at least part of the liquid produced during generation of electricity by the power generation device 10.

With the term hydraulic system is hereby meant a circuit formed by one or more pipes suitable to transport a liquid from one position to another, without necessarily including any machine, such as a pump, for circulating it.

In particular, as schematically represented in FIG. 1, the hydraulic system 20 used in the railway vehicle 100, comprises a first end portion 21 connected directly to the liquid discharging outlet 11 of the power generation device 10, a second end portion 22 which is spaced apart from the first end portion 21, and is suitable for draining out from the hydraulic system 20 the liquid circulating inside the hydraulic system 20, and a third intermediate portion 23 which is interconnected between the first portion 21 and the second portion 22 and is placed, at least partially, in an internal area of the car body 1 which is configured to be heated before starting the operation of the railway vehicle, and in particular before receiving passengers.

In one embodiment, the internal area of the car body 1 where the intermediate portion 23 is at least partially placed is a preheated area.

In particular, such internal area can be preheated by the main conditioning system of the rail vehicle 100, schematically indicated in FIG. 1 with the reference number 30, which is normally activated for preheating the passengers' compartment before starting a travel.

According to an embodiment, the third intermediate portion 23 is longer than the first end portion 21 and/or the second portion 22.

According to an embodiment, the third intermediate portion 23 is placed, for a predominant part of its extension, namely for more than half of its total length, inside the interior space 3 suitable for accommodating passengers.

In particular, and as illustrated in FIG. 2 where the back wall 5 of the frame shell 2 has been partially removed for the sake of illustration, the third intermediate portion 23 is placed substantially completely inside the interior space 3 of the car body 1 suitable for accommodating passengers. By "substantially completely", one means that more than 75% of the total length of the third intermediate portion 23 is placed inside the interior space 3.

According to an embodiment, and as illustrated in FIGS. 1 and 2, the second end portion 22 is spaced apart from and is placed at a lower height with respect to the first end portion 21.

In this way, the liquid can flow inside the hydraulic system 20, just due to gravity, and therefore without needing any pump or similar device for forcing its circulation.

In particular, as illustrated in FIG. 1, the first end portion 21 is directly connected to the liquid discharging outlet 11 and is at least partially positioned outside the car body 1, e.g. above the roof 4, and can pass through the roof 4 in order to be coupled with the intermediate portion 23.

Such first portion 21 is conveniently sized to be as short as possible, in order to limit the part of the hydraulic system 20 exposed to external environment, and it is positioned as steep as possible in order to favorite quick flow of the liquid to be discharged from the outlet 11 towards the intermediate portion 23 of the hydraulic system 20.

In turn, the second end portion 22 protrudes, at least partially, outside the car body 1, e.g. through a hole provided on the back wall 5, as for instance illustrated in FIG. 1.

In particular, the length of the second end portion 22 protruding outside the car body 1 is conveniently sized on the one hand to be long enough for preventing that the liquid under discharge may cool down along the wall of the car body 1, and on the other hand to be short enough to prevent refreezing of liquid present inside such part protruding outside the car body 1 into the external environment.

According to one possible embodiment, the hydraulic system 20 comprises a unique pipe, e.g. a single-piece pipe, shaped to form the first end portion 21, the second end portion 22, and the third intermediate portion 23.

According to another possible embodiment, the hydraulic system 20 comprises two or more separate pipes suitably arranged and mutually connected in order to form the first end portion 21, the second end portion 22, and the third intermediate portion 23.

For example, a first pipe can form the first end portion 21, and a second pipe can form the second end portion 22 and the intermediate portion 23, with the intermediate portion 23 connected at its upstream free end to the pipe forming the first end portion 21.

Clearly, many other alternatives are possible in terms of number and shape of pipes to be used for building the needed hydraulic system 20, according to the specific application and in order to route the liquid along any desired and suitable path.

As evident to those skilled in the art, the pipe or pipes used can be made of any material suitable for the scope, with or without any coating or lining thereof.

Figure 4:
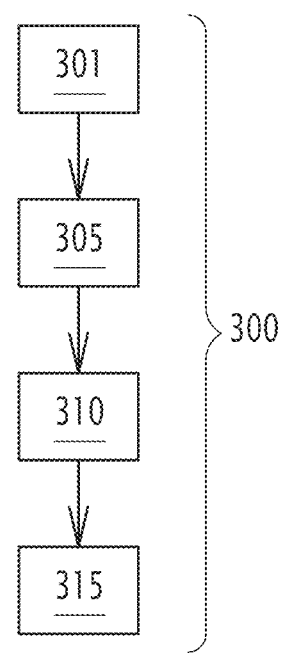
FIG. 4 is a flow chart schematically illustrating a method for preventing freezing of a liquid produced during generation of electricity by a power generation device associated to a railway vehicle, according to the present disclosure.

A method for discharging a liquid produced during generation of electricity by the power generation device 10 connected to an external side of the car body 1 of a railway vehicle 100, schematically indicated in FIG. 4 by the overall reference number 300, comprises the following phases:

301: putting a hydraulic system 20 in fluid communication with the outlet 11 of the power generation device 10, wherein at least a portion 23 of said hydraulic system 20 is placed, at least partially, in an internal area of the car body 1;

305: heating said internal area of the car body 1 before using said power generation device 10 under full power, the source of power for the heating being for example provided by the fuel cell running at low power inferior to the full power or by an embedded battery;

310: conveying, at least part of the liquid produced during generation of electricity by said power generation device 10, via said hydraulic system 20, inside said heated internal area;

315: draining outside the car body 1, via said hydraulic system 20, the conveyed liquid at a position spaced apart from said outlet 11.

In particular the phase 305 of heating the internal area comprises activating a heating system 30 of the rail vehicle 100, suitable to preheat the passengers' compartment, before using said power generation device 10 under full power.

Hence, it is evident from the foregoing description that the railway vehicle 100 and method 300 according to the present disclosure allow achieving the intended aim and objects since they effectively prevent the possible freezing of liquid during functioning of the associated power generation device 10, and thaw any part of frozen liquid which might be present before using up the power generator device 10 under full power inside the hydraulic system 20. This allows to ensure an optimized availability for the railway vehicle and to reduce the risk of failure/breakdown of the power generation device.

Indeed, as previously described, in particular thanks to the part of the hydraulic system 20 positioned in a tempered and better temperature-controlled environment, i.e. inside the car body 1, the possibility of liquid freezing is substantially minimized, if not eliminated at all.

At the same time, the preheating of the passengers compartment, which is normally activated before using the power generator device 10 under full power, substantially reduces the possibility of obstructing the fluid discharging outlet 11, thus preventing or limiting damage of the power generator 10 itself.

These results are achieved according to a solution very flexible that can be applied when building any new railway vehicle or in intervening on existing ones, with very simple and structurally minor modifications which, in the end, require the installation of a minimum number of pipes, ideally only one, and without requiring any type of sophisticated controls or additional heating equipment, since devices already currently used in railway vehicle are conveniently exploited for achieving the scope of the present disclosure.

The method 300 and railway vehicle 100 thus conceived are susceptible of modifications and variations, all of which are within the scope of the inventive concept as defined in particular by the appended claims; for example, in relation to the specific application, as those skilled in the art would appreciate, the path followed by hydraulic system 20 may be different with respect to that described as representative and non-limiting examples in connection with the attached figures.

All the details may furthermore be replaced with technically equivalent elements.

What is claimed is:

1. A railway vehicle comprising at least:

a car body having a shell frame surrounding an internal area;

a power generation device for generating electricity which is connected to an external side of said car body, wherein said power generation device comprises an outlet for discharging out a liquid produced during generation of electricity;

a hydraulic system which is in fluid communication with said outlet and receives at least part of the liquid produced during generation of electricity by said power generation device, wherein said hydraulic system comprises a first end portion connected to said outlet, a second end portion, spaced apart from said first end portion, for draining out from the hydraulic system the received liquid, and a third intermediate portion which is interconnected between said first and second end portions and is placed, at least partially, in the internal area which is adapted to be heated,
wherein said third intermediate portion is placed, for a predominant part of its extension, inside said internal area adapted to be heated which is suitable for accommodating passengers.

2. The railway vehicle according to claim 1, wherein the internal area is configured to be heated before receiving passengers.

3. The railway vehicle according to claim 1, wherein said third intermediate portion is longer than said first end portion and/or said second end portion.

4. The railway vehicle according to claim 1, wherein said second end portion is spaced apart from and placed at a lower height with respect to said first end portion.

5. The railway vehicle according to claim 1, wherein said first end portion is at least partially positioned outside the car body.

6. The railway vehicle according to claim 1, wherein said second end portion protrudes, at least partially, outside the car body.

7. The railway vehicle according to claim 1, wherein said hydraulic system comprises a unique pipe shaped to form said first end portion, said second end portion, and said third intermediate portion.

8. The railway vehicle according to claim 1, wherein said hydraulic system comprises two or more separate pipes arranged and mutually connected to form said first end portion, said second end portion, and said third intermediate portion, respectively.

9. The railway vehicle according to claim 1, wherein said power generation device comprises a fuel cell and said liquid produced during generation of electricity comprises water.

10. A method for discharging a liquid produced during generation of electricity by a power generation device connected to an external side of a car body of a railway vehicle, said power generation device comprising an outlet for discharging out at least part of said liquid produced during generation of electricity, the method comprising at least:
putting a hydraulic system in fluid communication with said outlet to receive at least part of the liquid produced during generation of electricity by said power generation device, wherein said hydraulic system comprises a first end portion connected to said outlet, a second end portion, spaced apart from said first end portion, for draining out from the hydraulic system the received liquid, and a third intermediate portion which is interconnected between said first and second end portions and is placed, at least partially, in an internal area of the railway vehicle which is adapted to be heated, wherein said third intermediate portion is placed, for a predominant part of its extension, inside said internal area adapted to be heated which is suitable for accommodating passengers;
heating said internal area of the car body;
conveying, at least part of the liquid produced during generation of electricity by said power generation device, via said hydraulic system, inside said heated internal area;
draining outside the car body, via said hydraulic system, the conveyed liquid at a position spaced apart from said outlet.

11. The method according to claim 10, wherein said heating said internal area of the car body comprises activating a heating system of the railway vehicle before the internal area receives passengers.

* * * * *